United States Patent
Wilson

[11] Patent Number: 5,902,002
[45] Date of Patent: May 11, 1999

[54] DUAL BLADE VISOR SYSTEM WITH MECHANICAL INTERFIT MOUNTING ASSEMBLY

[75] Inventor: Douglas J. Wilson, Burtchville, Mich.

[73] Assignee: Lear Corporation, Southfield, Mich.

[21] Appl. No.: 09/040,084

[22] Filed: Mar. 17, 1998

[51] Int. Cl.[6] ................................................. B60J 3/00
[52] U.S. Cl. ................................................ 296/97.13
[58] Field of Search .......................... 296/97.9, 97.12, 296/97.13

[56] References Cited

U.S. PATENT DOCUMENTS

| | | | |
|---|---|---|---|
| 1,898,276 | 2/1933 | Van Dresser . | |
| 2,831,726 | 4/1958 | Ralston . | |
| 2,912,275 | 11/1959 | O'Neal | 296/97.13 |
| 2,917,186 | 12/1959 | Beets | 296/97.13 |
| 2,965,415 | 12/1960 | Dryden | 296/97.13 |
| 3,339,970 | 9/1967 | Jensen | 296/97.13 |
| 4,529,157 | 7/1985 | Suman et al. | 296/97.13 |
| 4,666,205 | 5/1987 | Nakagawa . | |
| 4,681,363 | 7/1987 | Hemmeke et al. . | |
| 4,950,021 | 8/1990 | Vandagriff . | |
| 4,989,911 | 2/1991 | Van Order . | |
| 5,080,420 | 1/1992 | Hemmeke et al. . | |
| 5,421,632 | 6/1995 | Adomeit et al. . | |
| 5,580,117 | 12/1996 | Goclowski . | |

*Primary Examiner*—Gary C. Hoge
*Attorney, Agent, or Firm*—Brooks & Kushman PC

[57] ABSTRACT

A visor system for a vehicle comprises first and second visor blades, first and second support arms supporting said first and second visor blades, respectively, and first and second mounting assemblies. The first mounting assembly includes a first member connected to the first support arm. The first member has a journal, a tang and a configured projection adapted to lockingly interfit with the vehicle. A second member coaxial with the first member is pivotable about the journal, and is connected to the second support arm. The second member also has a slot through which the tang is moveable and a channel which slidably engages the tang to retain the second member about the journal. The second mounting assembly is connected to the first visor blade and is adapted to snap fit into the vehicle. The mounting assemblies are adapted to fixably position the first support arm with respect to the vehicle, while enabling the second support arm and the second visor blade to pivot with respect to the vehicle.

19 Claims, 5 Drawing Sheets

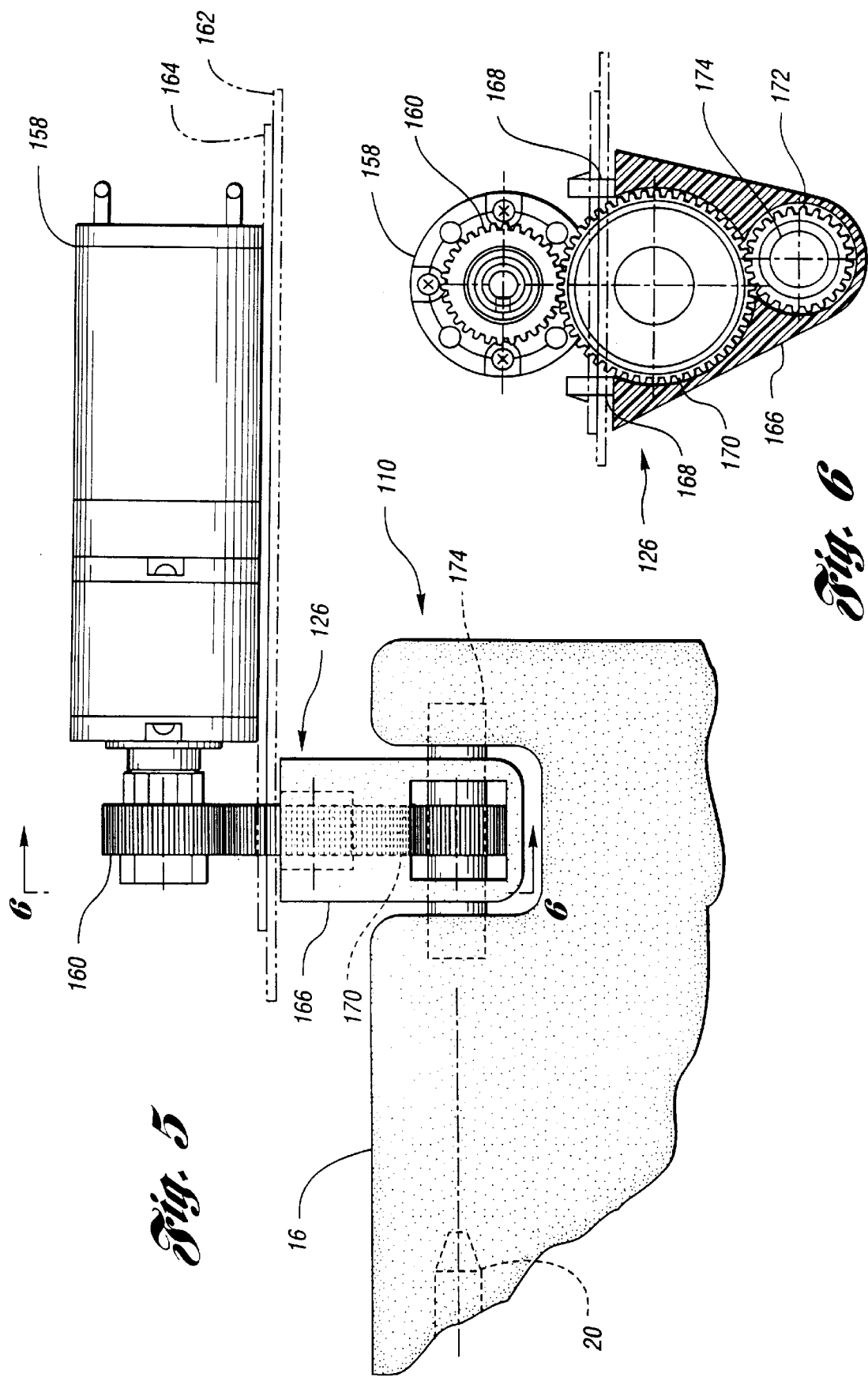

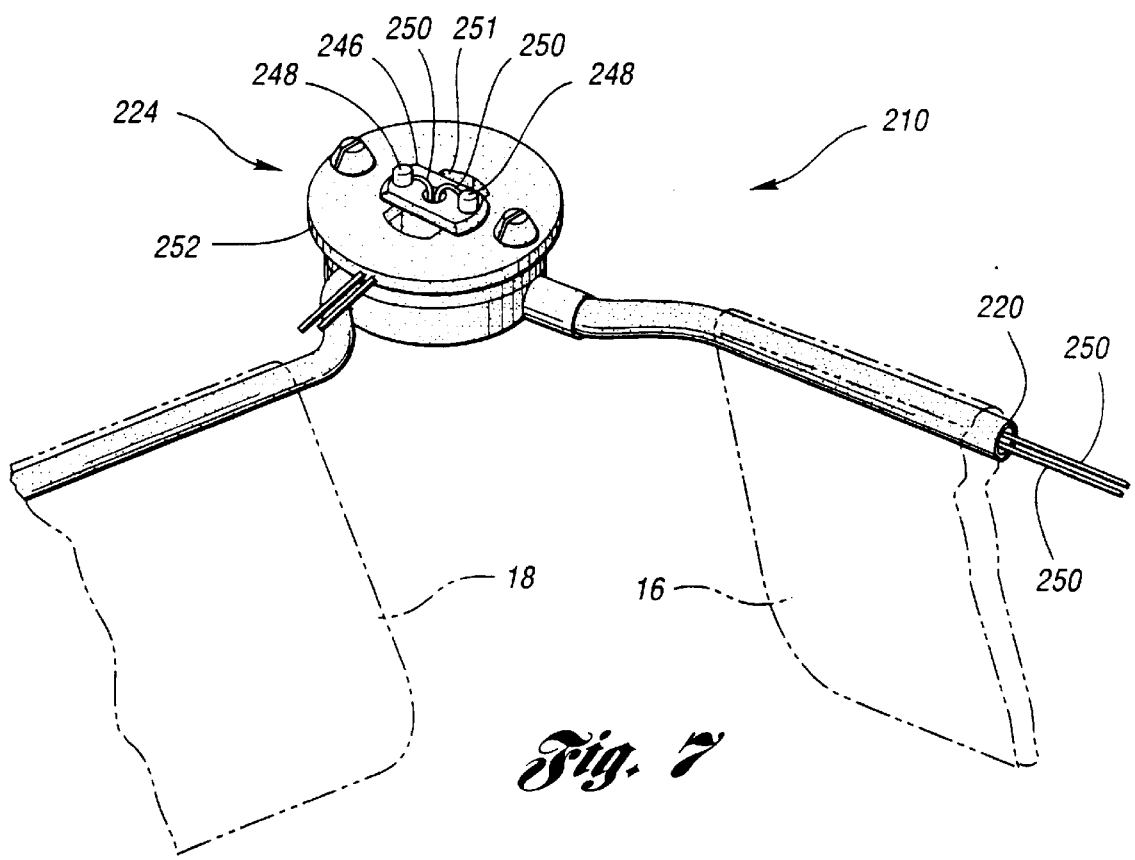
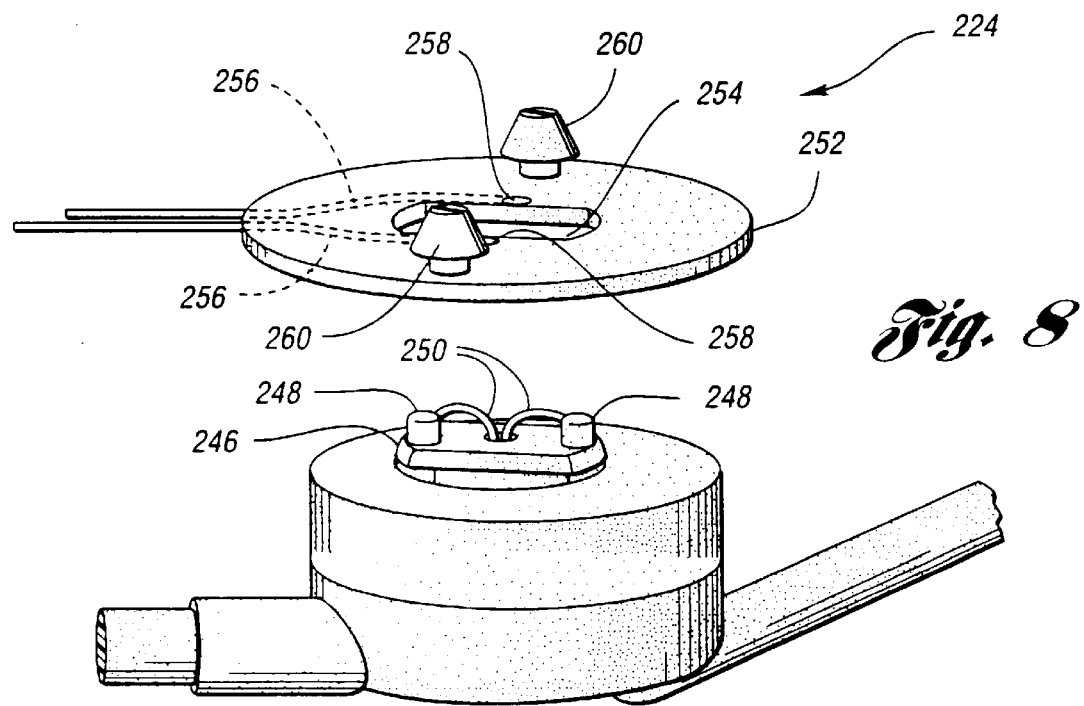

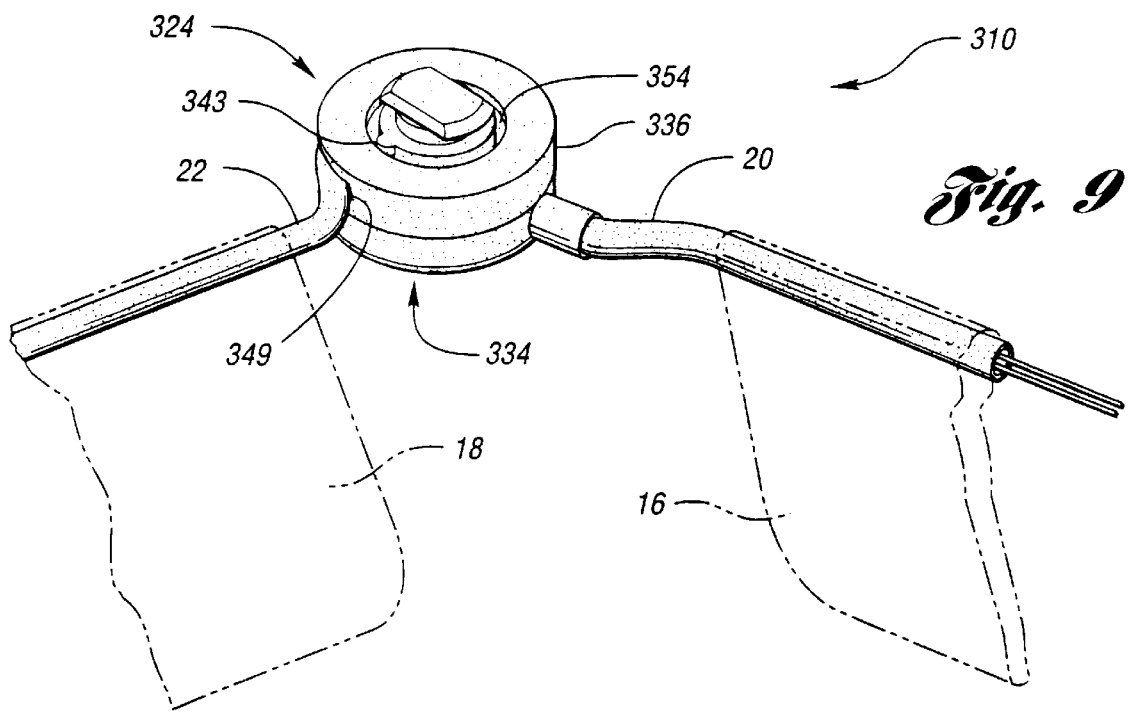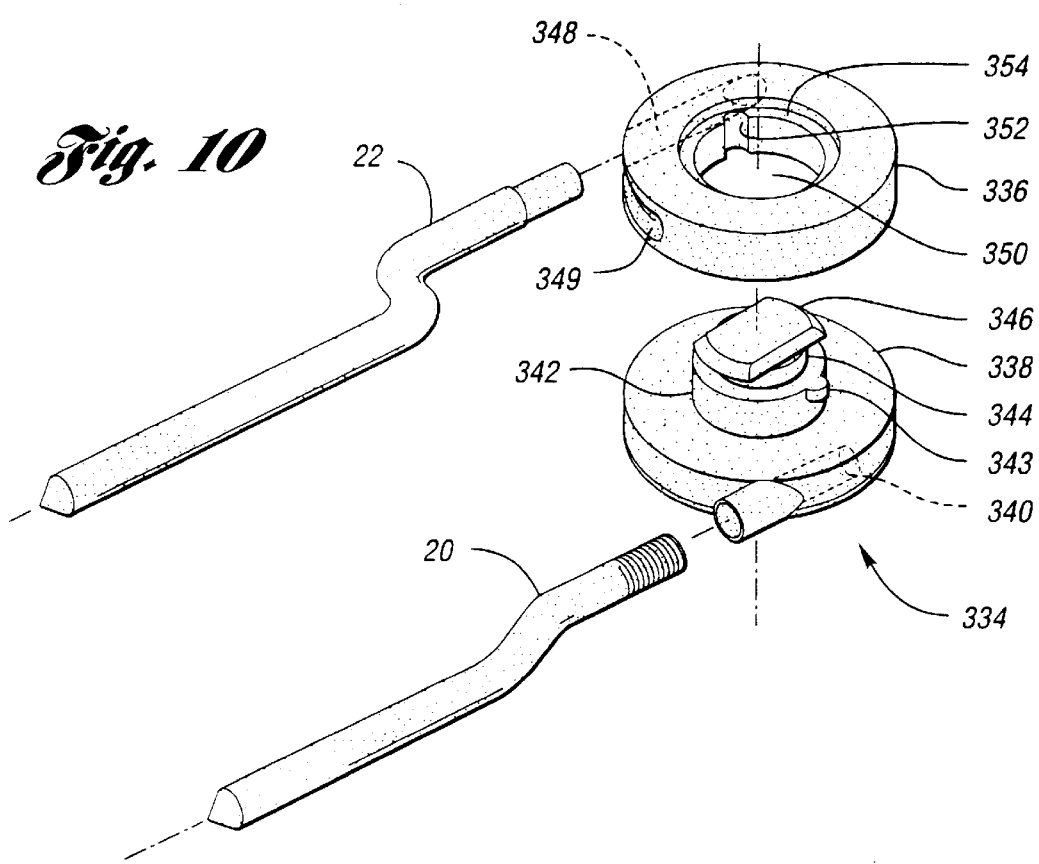

DUAL BLADE VISOR SYSTEM WITH MECHANICAL INTERFIT MOUNTING ASSEMBLY

TECHNICAL FIELD

The invention relates to dual blade sun visors for motor vehicles.

BACKGROUND ART

Prior dual blade sun visor systems for motor vehicles are secured to a sheet metal roof or to a headliner of the vehicle with conventional fasteners. U.S. Pat. No. 5,080,420, for example, shows a dual blade visor system including two mounting brackets secured to a vehicle with screws. Such a visor system requires a tool and a significant amount of time to install.

U.S. Pat. No. 5,421,632 shows another multiple visor system which may be secured to a vehicle using snap-in mounting assemblies of the type illustrated in U.S. Pat. No. 4,989,911. Such mounting assemblies, however, are complex in design and relatively expensive to manufacture. Furthermore, conventional visor mounting brackets, or other visor mounting sub-assemblies, must first be secured to the snap-in mounting assemblies prior to installing the visor system in the vehicle. Consequently, a significant amount of time is required to assemble and install the entire visor system.

SUMMARY OF THE INVENTION

The invention is a visor system for a vehicle comprising first and second visor blades, the second visor blade being pivotable with respect to the vehicle; first and second support arms supporting the first and second visor blades, respectively; and a compound mounting assembly including a configured projection adapted to lockingly interfit with the vehicle, and first and second coaxial members which pivotably engage each other. The first member is connected to the first support arm and the second member is connected to the second support arm. The compound mounting assembly is adapted to fixably position the first support arm with respect to the vehicle, while enabling the second support arm and the second visor blade to pivot with respect to the vehicle when the configured projection lockingly interfits with the vehicle.

Accordingly, it is an object of the invention to provide an improved dual blade visor system which can be installed in and removed from a motor vehicle without the use of tools.

It is another object of the invention to provide an improved dual blade visor system which can be quickly and easily installed in the vehicle.

It is another object of the invention to provide an improved dual blade visor system including a compound mounting assembly which is relatively inexpensive to manufacture.

It is another object of the invention to provide a dual blade visor system including a mounting assembly with means to automatically rotate a visor blade.

Still another object of the invention is to provide a dual blade visor system including a direct connect electrical system.

A more specific object of the invention is to provide a visor system including first and second visor blades; first and second support arms; and a compound mounting assembly having first and second coaxial members which pivotably engage each other, and a projection which is adapted to lockingly interfit with the vehicle; wherein the compound mounting assembly is adapted to fixably position the first support arm with respect to the vehicle, while enabling the second support arm and the second visor blade to pivot with respect to the vehicle.

Another more specific object of the invention is to provide a mounting arrangement for positioning a main blade and an auxiliary blade of a dual-bladed vehicle sun visor, the mounting arrangement including a main blade support member having a projection adapted to lockingly interfit with the vehicle, a journal and a main blade support arm adapted to support the main blade in a fixed position with respect to the vehicle; and an auxiliary blade support member coaxial with the main blade support member and pivotable about the journal, the auxiliary blade support member having an auxiliary blade support arm adapted to support the auxiliary blade; wherein the auxiliary blade support arm is pivotable with respect to the main blade support arm.

These and other objects, features and advantages of the present invention are readily apparent from the following detailed description of the best mode for carrying out the invention when taken in conjunction with the accompanying drawings.

BRIEF DESCRIPTION OF THE DRAWINGS

FIG. 5 is a fragmentary front view of a second embodiment of the dual blade visor system according to the invention and including a second mounting assembly with a motor for automatically rotating the first visor blade;

FIG. 6 is a cross-sectional view of the second mounting assembly taken on line 6—6 of FIG. 5 in the direction of the arrows;

FIG. 7 is a fragmentary perspective view of a third embodiment of the dual blade visor system according to the invention and including a first mounting assembly with a direct connect electrical system;

FIG. 8 is an enlarged fragmentary perspective view of the first mounting assembly of FIG. 7 showing a snap-fit retainer bracket removed from the assembly;

FIG. 9 is a fragmentary perspective view of a fourth embodiment of the dual blade visor system according to the invention and including a first mounting assembly with a locking tang; and FIG. 10 is an exploded perspective view of the first mounting assembly and first and second support arms of FIG. 9.

BEST MODES FOR CARRYING OUT THE INVENTION

Figure 1:
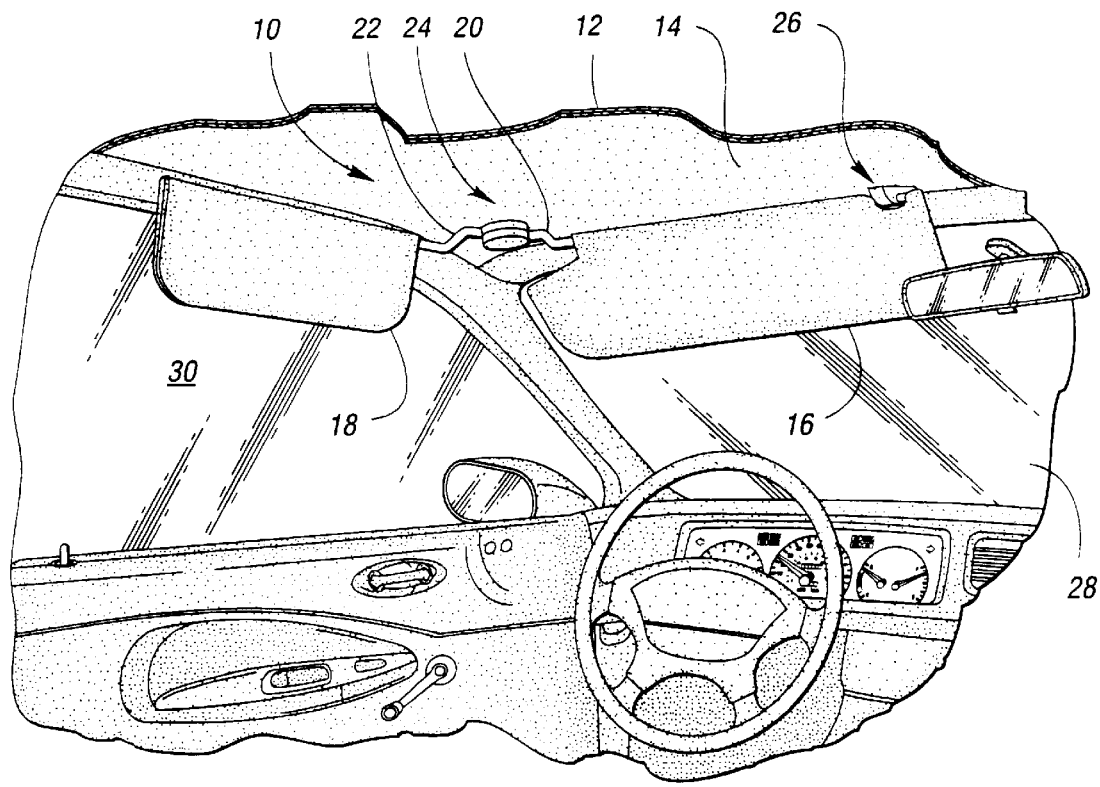
FIG. 1 is a perspective view of a dual blade visor system according to the invention and including first and second visor blades, first and second support arms and first and second mounting assemblies mounted to a sheet metal roof of a motor vehicle.

With reference to the drawings, the preferred embodiments of the invention will be described. FIG. 1 shows a first embodiment 10 of a dual blade visor system according to the invention mounted to an inner sheet metal roof 12 through a headliner 14 of a motor vehicle. The visor system 10 comprises a main or first visor blade 16; an auxiliary or second visor blade 18; first and second support arms 20 and 22, respectively; and first and second mounting assemblies 24 and 26, respectively.

Figure 2:
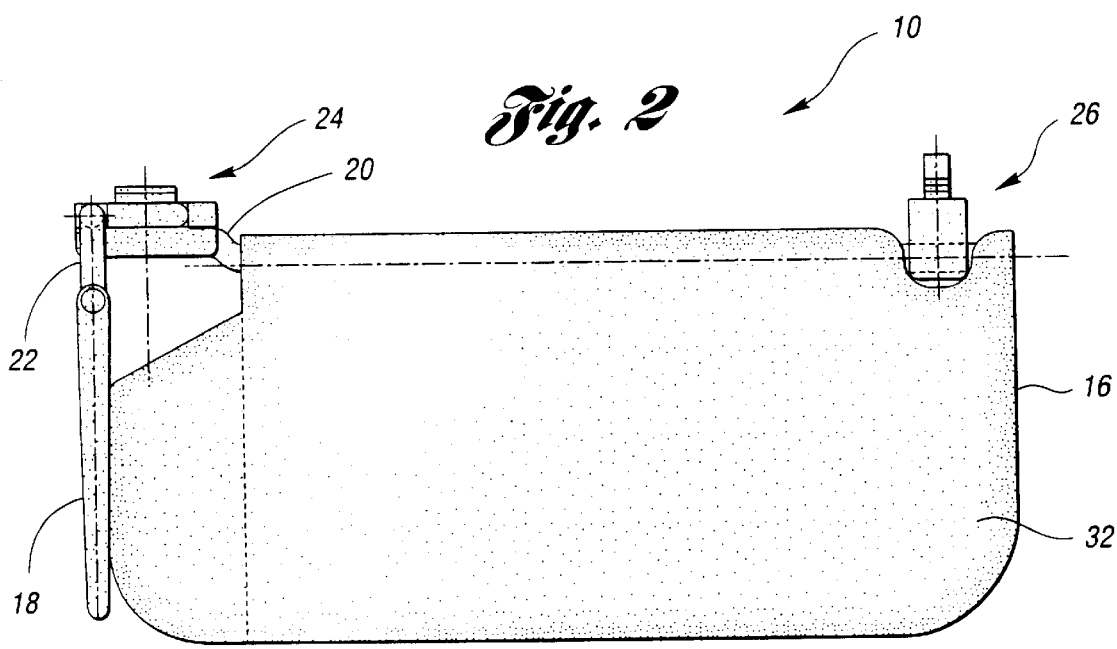
FIG. 2 is a front view of the dual blade visor system.

The first visor blade 16 is rotatably supported by the first support arm 20, and is preferably fixably positioned adjacent a front windshield 28 of the vehicle. The second visor blade 18 is rotatably supported by the second support arm 22, and is pivotable between the front windshield 28 and a side window 30 of the vehicle. Each of the visor blades 16 and 18 has a core made of any suitable material, such as fiberboard or polymeric material, and a cover material 32 which is placed over the core, as shown in FIG. 2. The cover material 32 may be fabric, vinyl, leather, or any other suitable material. Furthermore, the first visor blade 16 may include a vanity mirror with or without illumination. Alternatively, the first visor blade 16 may be a standard visor blade as shown.

Figure 3:
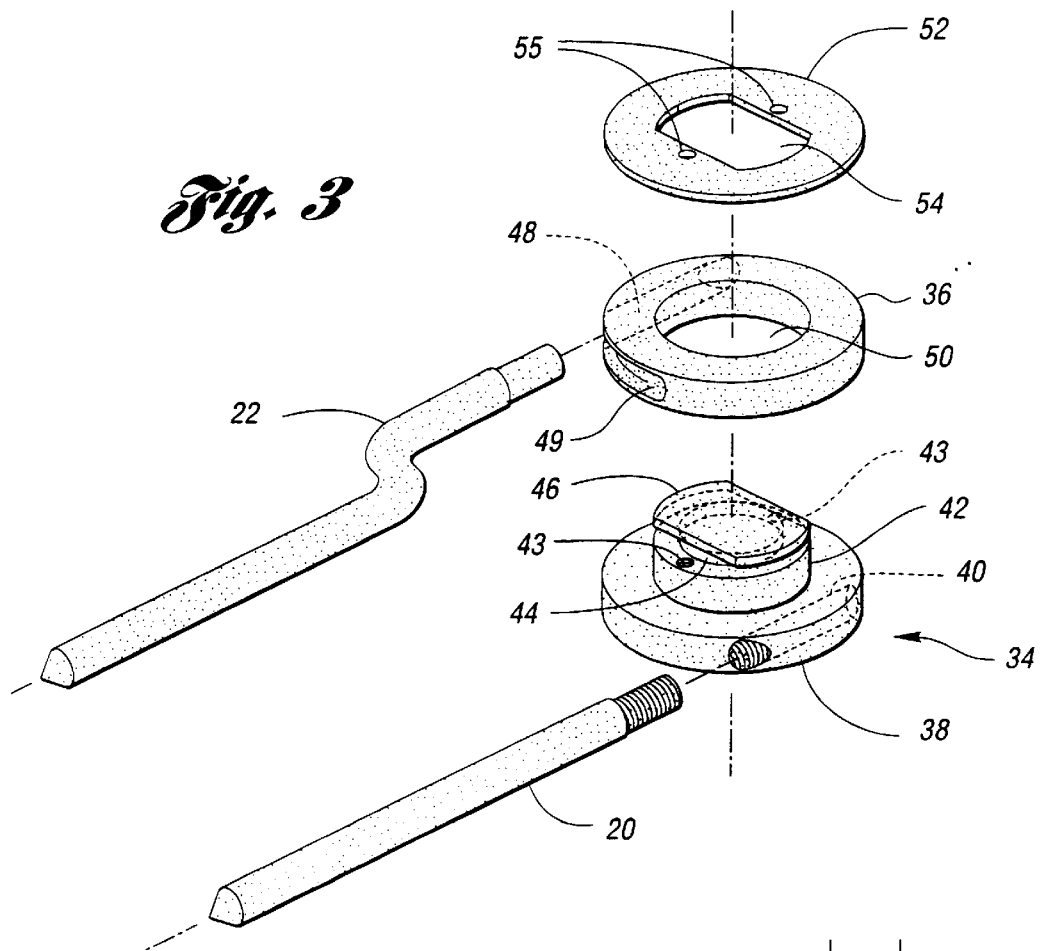
FIG. 3 is an exploded perspective view of the first mounting assembly and the first and second support arms.

FIG. 3 shows the first or compound mounting assembly 24 including first and second members 34 and 36 which are coaxially alignable and pivotably engageable with each other. The first member 34 has a generally cylindrical base 38 with a passageway 40 for receiving the first support arm 20. An end on the first support arm 20 may be threaded into the passageway 40 so that they are connectable with each other. Alternatively, the base 38 and the first support arm 20 may be connected in any manner known to those skilled in the art, such as by molding the support arm into the base. A preferably generally cylindrical journal 42 extends from the base 38, and includes two threaded holes 43 for receiving fasteners. A projection 44 extends from the journal 42, and includes a boss 46 which is configured to be insertable through a corresponding aperture in the roof 12.

The second member 36 is also preferably formed with a generally cylindrical shape, and has a passageway 48 for receiving the second support arm 22 and a groove 49 which is engageable with a bend in the support arm to hold the support arm in a stowed position. The second support arm 22 may be connected to the second member 36 with a bolt or other suitable fastener which allows the support arm to rotate out of the groove 49. Alternatively, the second member 36 and the second support arm 22 may be connected in any manner known to those skilled in the art, such as by molding the second support arm into the second member. The second member 36 further has an inner surface which defines a generally cylindrical aperture 50 extending therethrough. The aperture 50 is sized and shaped to closely mate with the journal 42 such that the second member 36 is pivotable about the journal.

The first mounting assembly 24 also preferably includes a retainer bracket 52 for retaining the second member 36 about the journal 42. The retainer bracket 52 has an opening 54, which is sized slightly larger than the boss 46, so that the boss may extend through the opening. Two smaller holes 55 are positioned on opposite sides of the opening 54, and are configured to receive fasteners for joining the retainer plate 52 to the first member 34.

Figure 4:
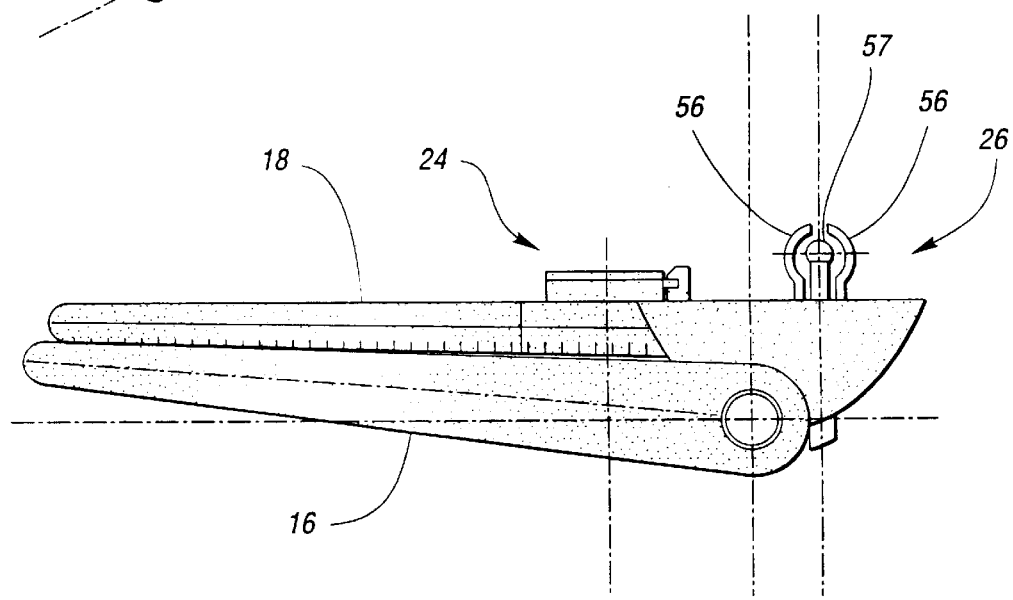
FIG. 4 is a side view of the dual blade visor system showing the second mounting assembly and the visor blades in a raised, stored position.

As shown in FIG. 4, the second mounting assembly 26 preferably includes a snap-in check including a pair of displacable legs 56 which are engageable with the roof 12 of the vehicle. A movable locking pin 57 is disposed between the legs and displaces the legs 56 outwardly when the pin is moved upwardly. Alternatively, the second mounting assembly 26 may be of any type known to those skilled in the art which is adapted to snap-fit into the vehicle.

To assemble the visor system 10, the first and second support arms 20 and 22 are connected to the first and second members 34 and 36, respectively, as previously described. The second member 36 is then placed over the first member 34 so that the aperture 50 is aligned with the journal 42. Next, the retainer bracket 52 is placed over the second member 36 to sandwich the second member between the base 38 and the retainer bracket. At this point, the projection 46 of the first member 34 extends through the opening 54 of the retainer bracket 52. The first member 34 and the retainer bracket 52 are then rotated to align the holes 43 and 55. Bolts or other suitable fasteners are then inserted through the holes 55, and are threaded into the holes 43 to fasten the first member 34 and the retainer bracket together, with the second member sandwiched therebetween.

Next, the visor blades 16 and 18 are mounted on the support arms 20 and 22 in any manner known to those skilled in the art. The second mounting assembly 26 is then permanently connected to the first visor blade 16, such that the first visor blade cannot be disconnected from the second mounting assembly when the visor system 10 is installed in the vehicle. The visor system 10 can then be shipped as a single unit, as shown in FIG. 4, for easy installation in the vehicle.

To install the visor system 10 in the vehicle, the boss 46 is inserted through the corresponding aperture in the inner sheet metal roof 12. The visor system is then rotated approximately 90 degrees to interlock the boss with the roof 12 and to align the second mounting assembly 26 with a second aperture in the roof 12. Next, the displacable legs 56 and locking pin 57 of the second mounting assembly 26 are inserted through the second aperture, and the pin is pushed upwardly to lock the second mounting assembly to the roof 12. Thus, the visor system 10 can be installed in the vehicle quickly and easily, without the aid of tools. The visor system 10 can also be removed from the vehicle by reversing the installation process.

Once the visor system 10 is installed in the vehicle, the mounting assemblies 24 and 26 cooperate to hold the first support arm 20 and the first visor blade 16 in a fixed position adjacent the front windshield 28. The first mounting assembly 24 also enables the second support arm 22 and the second visor blade 18 to pivot between the front windshield 28 and the side window 30. Each of the visor blades 16 and 18 may be rotated about its respective support arm 20, 22. The support arm 22 may also be rotated out of the groove 49 to lower the visor blade 18 with respect to the mounting assembly 24.

FIGS. 5 and 6 show a second embodiment 110 of the visor system according to the present invention and including a second mounting assembly 126 for automatically rotating the first visor blade 16 about the support arm 20. The second mounting assembly 126 includes a motor 158 having a spur gear 160. The motor 158 is connected to a base 162 having a raised platform 164, and the platform is adapted to snap-fit into a corresponding aperture in the roof 12 of the vehicle.

The second mounting assembly 126 also includes a check 166 having two displacable legs 168 which snap-fit into the base 162. Alternatively, the check 166 may be connected to the base 162 in any manner known to those skilled in the art. The check 166 further has a middle rotatable spur gear 170, which is driven by the motor spur gear 160 and rotatably engages a lower rotatable spur gear 172. The lower spur gear 172 is mounted on a shaft 174, which is fixedly connected to the first visor blade 16.

The visor system 110 can be installed in the vehicle as previously described. The motor 158 must also be connected to a power supply (not shown). Once installed, the motor 158 and spur gear 160 are concealed above the roof 12. When the motor is activated, the motor spur gear 160 rotates and drives the middle spur gear 170, which in turn drives the lower spur gear 172. Rotation of the lower spur gear 172 causes the shaft 174 and the first visor blade 16 to rotate automatically.

FIGS. 7 and 8 show a third embodiment 210 of the visor system according to the present invention and including a concealed, direct connect electrical system. The visor system 210 includes a hollow first support arm 220 and a first mounting assembly 224, as well as the other components described with respect to the first embodiment 10 of the visor system.

The first mounting assembly 224 includes a boss 246 having two direct connect electrical terminals 248 which extend through the boss. A pair of wires 250 are connected to the terminals 248, one wire being connected to each terminal. The wires 250 extend through a passageway 251 and into the first support arm 220 to provide electrical power to the first visor blade 16.

The first mounting assembly 224 also includes a retainer bracket 252 for retaining the mounting assembly together. The retainer bracket 252 has an opening 254, which is sized slightly larger than the boss 246 so that the boss may extend through the opening. Two electrical wires 256, which are preferably molded into the retainer bracket 252, are connectable with an external power supply (not shown). Each of the wires 256 is connected to a respective one of two terminals 258 disposed on opposite sides of the opening 254, and the terminals 258 are alignable with the terminals 248 on the boss 246. The retainer bracket 252 can be rotated with respect to the boss 246 to lockingly interfit the bracket with the boss and to align the terminals 248 and 258.

The retainer bracket 252 also includes two projections 260 which snap fit into corresponding apertures in the inner sheet metal roof 12 to mount the first mounting assembly 224 to the roof. Alternatively, the retainer bracket 252 may be configured to snap fit with the first mounting assembly 224, and the boss 246 may be configured to lockingly interfit with a corresponding aperture in the roof 12 in a manner similar to that described with respect to the visor system 10.

Once assembled, the visor system 210 provides a concealed electrical system which is adapted to provide power to a lighted vanity mirror or other feature on the first visor blade 16. Alternatively, the visor system 210 can be configured such that it is adapted to provide power to a feature on the auxiliary blade 18.

FIGS. 9 and 10 show a fourth embodiment 310 of the visor system according to the present invention and including a first or compound mounting assembly 324, as well as the other components described with respect to the first embodiment 10 of the visor system. The first mounting assembly 324 includes first and second members 334 and 336 which are coaxially alignable and pivotably engageable with each other. The first member 334 has a generally cylindrical base 338 with a passageway 340 for receiving the first support arm 20. An end on the first support arm 20 may be threaded into the passageway 340 so that they are connectable with each other. Alternatively, the base 338 and the first support arm 20 may be connected in any manner known to those skilled in the art, such as by molding the support arm into the base. A preferably generally cylindrical journal 342 extends from the base 338, and includes a locking tang 343. A projection 344 extends from the journal 342, and includes a boss 346 which is configured to be insertable through a corresponding aperture in the roof 12.

The second member 336 is also preferably formed with a generally cylindrical shape, and has a passageway 348 for receiving the second support arm 22 and a groove 349 which is engageable with a bend in the support arm to hold the support arm in the stowed position. The second support arm 22 may be connected to the second member 336 with a bolt or other suitable fastener which allows the support arm to be rotated out of the groove 349. Alternatively, the second member 336 and the second support arm 22 may be connected in any manner known to those skilled in the art, such as by molding the second support arm into the second member. The second member 336 further has an inner surface which defines a generally cylindrical aperture 350 and a slot 352 extending therethrough. A circumferential channel 354 is disposed about the aperture 350, and is slidably engageable with the first member tang 343.

To assemble the first mounting assembly 324, the second member 336 is placed over the first member 334 such that the journal 342 is aligned with the aperture 350 and the tang 343 is aligned with the slot 352. The tang 343 is then inserted through the slot 352 until the tang rises above the slot. Next, the first member 334 is pivoted so as to slide the tang 343 into the channel 354, thereby pivotably locking the first and second members 334 and 336 together. The other components of the visor system 310 may be assembled and installed in the vehicle in a manner similar to that described with respect to the first embodiment 10 of the visor system. Once installed in the vehicle, the tang 343 is not alignable with the slot 352 during normal operation of the visor system 310.

The invention has been described in an illustrative manner, and it is to be understood that the terminology which has been used is intended to be in the nature of words of description rather than of limitation. Obviously, many modifications and variations of the invention are possible in light of the above teachings. It is, therefore, to be understood that within the scope of the appended claims, the invention may be practiced otherwise than as specifically described.

What is claimed is:

1. A visor system for a vehicle comprising:
   first and second visor blades, said second visor blade being pivotable with respect to the vehicle;
   first and second support arms, said first arm supporting said first visor blade, and said second arm supporting said second visor blade; and
   a compound mounting assembly including a configured projection adapted to lockingly interfit with the vehicle, and first and second members which are coaxial and pivotably engage each other, said first member being connected to said first support arm, said second member being connected to said second support arm;
   wherein said compound mounting assembly is adapted to fixably position said first support arm with respect to the vehicle, while enabling said second support arm and said second visor blade to pivot with respect to the vehicle when said configured projection lockingly interfits with the vehicle.

2. The visor system of claim 1 wherein said first member includes said configured projection.

3. The visor system of claim 1 wherein said first member further includes a tang and said second member further includes a slot through which said tang is moveable and a channel which slidably engages said tang to lockingly, pivotably join said first and second members together.

4. The visor system of claim 1 wherein said first member further includes a journal and said second member is pivotable about said journal.

5. The visor system of claim 1 further comprising an additional mounting assembly spaced away from said compound mounting assembly and further supporting said first visor blade, said additional mounting assembly being adapted to snap-fit into the vehicle.

6. The visor system of claim 1 further comprising an additional mounting assembly configured to cooperate with said first visor blade and adapted to snap-fit into the vehicle, said additional mounting assembly including means to automatically rotate said first visor blade about said first support arm.

7. The visor system of claim 1 further comprising a retainer bracket for retaining said first and second coaxial members together.

8. The visor system of claim 7 wherein said retainer bracket further has a retainer bracket projection, and said first member lockingly interfits with said retainer bracket projection.

9. The visor system of claim 8 wherein said retainer bracket and said configured projection each include an electrical terminal and an electrical wire connected to said terminal, wherein said terminals are alignable with each other to provide electrical power to the visor system when said first member lockingly interfits with said retainer bracket projection.

10. The visor system of claim 7 wherein said retainer bracket includes said configured projection.

11. The visor system of claim 10 wherein said configured projection is a snap-fittable projection.

12. The visor system of claim 10 wherein said first member further has a first member projection and said retainer bracket lockingly interfits with said first member projection.

13. The visor system of claim 12 wherein said retainer bracket and said first member projection each include an electrical terminal and an electrical wire connected to said terminal, wherein said terminals are alignable with each other to provide electrical power to the visor system when said retainer bracket lockingly interfits with said first member projection.

14. A visor system for a vehicle comprising:
 first and second visor blades, said second visor blade being pivotable with respect to the vehicle;
 first and second support arms, said first arm supporting said first visor blade, and said second arm supporting said second visor blade; and
 a first mounting assembly including:
  a first member connected to said first support arm, and having a journal, a tang and a configured projection adapted to lockingly interfit with the vehicle;
  a second member coaxial with said first member and pivotable about said journal, said second member being connected to said second support arm and having a slot through
  which said tang is moveable and a channel which slidably engages said tang to retain said second member about said journal; and
 a second mounting assembly spaced away from said first mounting assembly and further supporting said first visor blade, said second mounting assembly being adapted to snap-fit into the vehicle;
 wherein said first and second mounting assemblies are adapted to fixably position said first support arm with respect to the vehicle, while enabling said second support arm and said second visor blade to pivot with respect to the vehicle when said configured projection lockingly interfits with the vehicle and said second mounting assembly is snap-fit into the vehicle.

15. A mounting arrangement for positioning a main blade and an auxiliary blade of a dual-bladed vehicle sun visor, the mounting arrangement comprising:
 a main blade support member having a configured projection adapted to lockingly interfit with the vehicle, a journal, and a main blade support arm adapted to support the main blade of the sun visor in a fixed position with respect to the vehicle when said configured projection lockingly interfits with the vehicle; and
 an auxiliary blade support member coaxial with said main blade support member and pivotable about said journal, said auxiliary blade support member including an auxiliary blade support arm adapted to support the auxiliary blade of the sun visor;
 wherein said auxiliary blade support arm is pivotable with respect to said main blade support arm to position said auxiliary blade away from said fixed position of the main blade and in a movable position with respect to the vehicle when said configured projection lockingly interfits with the vehicle.

16. The mounting arrangement of claim 15 further comprising a retainer bracket for retaining said auxiliary blade support about said journal.

17. The mounting arrangement of claim 16 wherein said retainer bracket and said projection each include an electrical terminal and an electrical wire connected to said terminal, wherein said terminals are alignable with each other to provide electrical power to the visor system when said retainer bracket is retaining said auxiliary support about said journal.

18. A mounting arrangement for positioning a main blade and an auxiliary blade of a dual-bladed vehicle sun visor, the mounting arrangement comprising:
 a main blade support member having a configured projection, a journal, and a main blade support arm adapted to support the main blade of the sun visor; and
 an auxiliary blade support member coaxial with said main blade support member and pivotable about said journal, said auxiliary blade support member including an auxiliary blade support arm adapted to support the auxiliary blade of the sun visor;
 a retainer bracket which lockingly interfits with said configured projection to retain said auxiliary blade support about said journal, said retainer bracket having at least one retainer bracket projection adapted to snap-fit into the vehicle;
 wherein the mounting arrangement is adapted to fixably position the main blade with respect to the vehicle, while enabling said auxiliary blade support arm to pivot and thereby position the auxiliary blade away from said fixed position of the main blade and in a movable position with respect to the vehicle when said retainer bracket projection snap-fits into the vehicle.

19. The mounting arrangement of claim 18 wherein said retainer bracket and said configured projection each include an electrical terminal and an electrical wire connected to said terminal, wherein said terminals are alignable with each other to provide electrical power to the visor system when said retainer bracket lockingly interfits with said configured projection.

* * * * *